(12) United States Patent
Matsui

(10) Patent No.: US 7,816,440 B2
(45) Date of Patent: Oct. 19, 2010

(54) FLAME RETARDANT, FLAME-RETARDANT RESIN COMPOSITION AND MOLDED BODY

(75) Inventor: Seiji Matsui, Mitoyo (JP)

(73) Assignee: Konoshima Chemical Co., Ltd., Osaka (JP)

(*) Notice: Subject to any disclaimer, the term of this patent is extended or adjusted under 35 U.S.C. 154(b) by 62 days.

(21) Appl. No.: 12/067,551

(22) PCT Filed: Oct. 24, 2006

(86) PCT No.: PCT/JP2006/321132

§ 371 (c)(1),
(2), (4) Date: Mar. 20, 2008

(87) PCT Pub. No.: WO2007/049598

PCT Pub. Date: May 3, 2007

(65) Prior Publication Data

US 2009/0182082 A1 Jul. 16, 2009

(30) Foreign Application Priority Data

Oct. 25, 2005 (JP) ............................. 2005-309176

(51) Int. Cl.
| | |
|---|---|
| C08K 3/10 | (2006.01) |
| C08K 3/22 | (2006.01) |
| C01G 23/00 | (2006.01) |
| C01G 53/04 | (2006.01) |
| C01F 11/02 | (2006.01) |
| C01D 1/02 | (2006.01) |
| C08F 2/00 | (2006.01) |
| C08F 210/00 | (2006.01) |
| C08G 85/00 | (2006.01) |

(52) U.S. Cl. ............... 524/436; 524/413; 423/598; 423/594.16; 423/594.3; 423/594.6; 526/72; 526/348

(58) Field of Classification Search .............. 524/413, 524/436; 423/594.16, 598, 593.1, 594.1, 423/594.2, 594.3, 594.4, 594.5, 594.6
See application file for complete search history.

(56) References Cited

U.S. PATENT DOCUMENTS

| 5,151,455 A * | 9/1992 | Miyata et al. ............... 523/200 |
| 5,401,442 A * | 3/1995 | Miyata ....................... 252/609 |
| 5,422,092 A * | 6/1995 | Miyata ....................... 423/635 |
| 5,766,568 A * | 6/1998 | Kurisu et al. ............ 423/594.16 |
| 6,025,424 A * | 2/2000 | Katsuki et al. ............... 524/436 |
| 2005/0059754 A1* | 3/2005 | Lunt et al. .................. 523/210 |

FOREIGN PATENT DOCUMENTS

| JP | 3-505863 | 12/1991 |
| JP | 05-209084 | 8/1993 |
| JP | 06-041441 | 2/1994 |
| JP | 10-245456 | 9/1998 |
| JP | 2004-002884 | 1/2004 |
| JP | 2004-269723 | 9/2004 |
| JP | 2004-359839 | 12/2004 |
| WO | 90/13516 | 11/1990 |

* cited by examiner

*Primary Examiner*—Vasu Jagannathan
*Assistant Examiner*—Anthony H Sheh
(74) *Attorney, Agent, or Firm*—Rankin, Hill & Clark LLP

(57) ABSTRACT

A flame retardant includes magnesium-hydroxide particles that contain at least one transitional metal compound. The at least one transitional metal compound is at least one compound selected from a group consisting of copper compound, cobalt compound, nickel compound, zinc compound and titanium compound. The at least one transitional metal compound is contained in the magnesium-hydroxide particles with the content of 100 to 1000 mass ppm in terms of metals. In addition, the total content of the copper compound, the cobalt compound and the nickel compound is 1000 mass ppm in terms of metals or less while the total content of the zinc compound and the titanium compound is 1000 mass ppm or less.

5 Claims, No Drawings

FLAME RETARDANT, FLAME-RETARDANT RESIN COMPOSITION AND MOLDED BODY

TECHNICAL FIELD

The present invention is related to a magnesium-hydroxide-based flame retardant as a non-halogen-based flame retardant, a flame-retardant resin composition containing the same and a molded article thereof.

BACKGROUND ART

A thermoplastic resin, which is excellent in molding-processability and electrical insulation and moderate in price, is widely applied to coating materials for indoor cables, for home electric appliances, for thin electric wires coating of automobiles and the like, and wallpaper etc. So far, a polyvinyl-chloride-based resin has been heavily used for such purposes.

In an event of fire, however, products (for instance, cables) using the polyvinyl-chloride-based resin emit smoke in such an enormous quantity as to impede evacuation and fire-fighting activities in an enclosed space such as inside of an underground mall, a subway, a vessel or the like, which may lead to a secondary disaster. Accordingly, there has been a demand for a resin material that emit less smoke in an event of fire, and that generates less amount of poisonous gas such as carbon monoxide even when combusted. In recent years, out of concern for environmental issues such as dioxin, use of the polyvinyl-chloride-based resin has been less preferred than before.

Consequently, a non-halogen-based resin such as a polyolefin-based resin is more frequently used in place of the polyvinyl-chloride-based resin. However, since the polyolefin-based resin is more combustible than the polyvinyl-chloride-based resin, there have been attempts to add a magnesium-hydroxide-based compound to the polyolefin resin as a non-halogen-based flame retardant so that a flame-retardant polyolefin-based resin is obtained.

One of suggested magnesium-hydroxide-based flame retardants contains, for example, iron compounds, cobalt compounds, chrome compounds, copper compounds, vanadium compounds and nickel compounds such that the total metallic content thereof is less than 0.01 percent by weight (see, Patent Document 1). By reducing the content of such transitional metals, the resin is made more resistant to thermal degradation when the resin is melt-kneaded with the compounds.

Another suggested magnesium-hydroxide-based flame retardant is based on combined metal hydroxide represented by a chemical formula of $Mg_{1-x}M^{2+}{}_x(OH)_2$ (see, Patent Document 2), where $M^{2+}$ represents at least one of divalent metal ions selected from a group consisting of $Mn^{2+}$, $Fe^{2+}$, $Co^{2+}$, $Ni^{2+}$, $Cu^{2+}$ and $Zn^{2+}$ while X represents a range of $0.001 \leq X \leq 0.005$ or $0.7 \leq X \leq 0.9$. By using a magnesium-hydroxide-based flame retardant based on such a composite, acid resistance of a molded article (e.g., a communication cable) is enhanced.

[Patent Document 1] JP-A-2004-002884
[Patent Document 2] JP-A-05-209084

DISCLOSURE OF THE INVENTION

Problems to be Solved by the Invention

However, the flame retardants according to Patent Documents 1 and 2 have not necessarily made a sufficient contribution to improvement of flame retardancy, reduction of carbon monoxide yield or reduction of smoke quantity.

An object of the present invention is to provide a magnesium-hydroxide-based flame retardant capable of enhancing flame retardancy of a resin molded article when compounded into a resin and reducing carbon monoxide yield and smoke quantity when the resin molded article is combusted, a flame-retardant resin composition containing the same and a molded article thereof.

Means for Solving the Problems

A flame retardant according to an aspect of the present invention includes magnesium-hydroxide particles that contain at least one transitional metal compound, in which the at least one transitional metal compound is selected from a group consisting of copper compound, cobalt compound, nickel compound, zinc compound and titanium compound, the at least one transitional metal compound is contained with the content of 100 to 1000 mass ppm in terms of metals, and a total content of the copper compound, the cobalt compound and the nickel compound is 1000 mass ppm in terms of metals or less while a total content of the zinc compound and the titanium compound is 1000 mass ppm in terms of metals or less.

According to this aspect of the present invention, the flame retardant includes the magnesium-hydroxide particles containing the transitional metal compound that is at least one compound selected from the specified five compounds. Since the flame retardant contains the at least one compound selected from the compounds with the content of 100 to 1000 mass ppm in terms of metals, a resin molded article compounded with the flame retardant exhibits a high level of flame retardancy and emits less quantity of smoke. In addition, since the total amount of the copper compound, the cobalt compound and the nickel compound is 1000 mass ppm or less in terms of metals while the total amount of the zinc compound and the titanium compound is 1000 mass ppm or less in terms of metals, the resin molded article compounded with the flame retardant is much less colored and yields less quantity of carbon monoxide when combusted.

The magnesium-hydroxide particles are required to contain at least one of the above-described transitional metal compounds with the content of 100 to 1000 mass ppm in terms of metals. The content is preferably 100 to 600 mass ppm and more preferably 100 to 300 mass ppm. The magnesium-hydroxide particles may contain two or more of the transitional metal compounds with the respective contents of 100 to 1000 mass ppm in terms of metals.

When the at least one of the transitional metal compounds is contained with the content of less than 100 mass ppm in terms of metals, a sufficient level of flame retardancy is not obtained and carbon-monoxide yield and smoke quantity are increased. On the other hand, when the at least one of the transitional metal compounds is contained with the content of more than 1000 mass ppm in terms of metals, coloration of the resin becomes strong in cases of copper, cobalt and nickel. In cases of zinc and titanium, although there is no problem with the coloration of the resin, carbon-monoxide yield is not favorably reduced. Accordingly, while the total content of the copper, cobalt and nickel needs to be 1000 mass ppm or less, the total content of the zinc and titanium needs to be 1000 mass ppm or less.

It is considered that flame retardancy is enhanced because the above-described transitional metals serve as a catalyst for promoting a carbonization of an exterior surface of the resin molded article to provide oxygen insulation when the resin molded article is combusted. The transitional metals are considered to serve also as oxidation catalyst so as to easily convert yielded carbon monoxide into carbon dioxide. Presumably, when the resin is combusted, the transitional metal compounds are turned into active oxides to effectively absorb incompletely-combusted soot generated in the combustion.

The transitional metal compounds may be chloride, sulfate salt, nitrate salt or carboxylate. Alternatively, the compounds may be oxide, hydroxide or a sulfide or may be simple metals.

As a method of incorporating the transitional metal compounds into the magnesium-hydroxide particles, the transitional metal compounds may be added to the magnesium-hydroxide particles during a step of material adjustment before hydrothermal-processing, or after the intended particles are obtained. Alternatively, the addition of transitional metal compounds and a later-described surface treatment of the magnesium-hydroxide particles with stearic acid or the like may be conducted simultaneously. As another method, the transitional metal compounds may be blended into powdered magnesium-hydroxide by a dry method.

In the flame retardant according to the aspect of the present invention, it is preferable that a BET specific surface area of the magnesium-hydroxide particles is in a range of 1 to 20 $m^2/g$ and an average particle diameter of the magnesium-hydroxide particles is in a range of 0.5 to 5 μm.

According to the aspect of the present invention, the BET specific surface area of the magnesium-hydroxide used as the flame retardant is 1 to 20 $m^2/g$ and the average particle diameter is 0.5 to 5 μm, thereby satisfying requirements for fundamental characteristics of the flame-retardant resin composition. Specifically, when the BET specific surface area is more than 20 $m^2/g$ or the average particle diameter is less than 0.5 μm, the flame retardant can be easily reaggregated when compounded into the resin, thereby deteriorating dispersibility of the flame retardant in the resin. Consequently, appearance and tensile-elongation ratio of the molded article may be deteriorated. When the BET specific surface area is less than 1 $m^2/g$ or the average particle diameter is more than 5 μm, flame retardancy and tensile strength are deteriorated although there is no problem with the dispersibility of the flame retardant in the resin.

In the flame retardant according to the aspect of the present invention, it is preferable that the magnesium-hydroxide particles are surface-treated with at least one surface-treating agent selected from a group consisting of a higher fatty acid, a higher fatty acid with metallic salt, an anion-based surfactant, a coupling agent, esters including polyhydric alcohol and phosphate esters.

According to the aspect of the present invention, since the magnesium-hydroxide particles are surface-treated with a predetermined surface-treating agent, affinity of the magnesium-hydroxide particles for the resin is enhanced as compared with particles not surface-treated, such that the dispersibility of the particles in the resin is improved, thereby improving tensile properties and impact resistance. In addition, water-repellant effect owing to coating of the particles with the surface-treating agent enhances water resistance and acid resistance.

Specifically, as the surface-treating agent, the following agents can be favorably used: a higher fatty acid, particularly a higher fatty acid with carbon number of 10 or more such as stearic acid, erucic acid, palmitic acid, lauric acid, and behenic acid; alkali metal salts of the above-described higher fatty acids; an anion surfactant such as a sulfate ester salt of a higher alcohol (e.g., stearyl alcohol or oleyl alcohol), and a sulfate ester salt, an amide-linked sulfate ester salt, an ester-linked sulfate ester salt, an ester-linked sulfonate, an amide-linked sulfonate, an ether-linked sulfonate, and an ether-linked alkyl aryl sulfonate, an ester-linked alkyl aryl sulfonate, an amide-linked alkyl aryl sulfonate and the like of polyethylene glycol ether; a coupling agent such as a silane coupling agent, a titanate-based coupling agent and an aluminum-based coupling agent, the silane coupling agent being exemplified by vinylethoxysilane, vinyl-tris (2-methoxyethoxy) silane, γ-methacryloxy propyl trimethoxy silane, γ-amino propyl trimethoxy silane, β-(3,4-epoxycyclohexyl) ethyltrimethoxysilane, γ-glycidoxy propyl trimethoxy silane, γ-mercapto propyl trimethoxy silane and the like, the titanate-based coupling agent being exemplified by isopropyl tri isostearoyl titanate, isopropyl tris (dioctyl pyrophosphate) titanate, isopropyl tri (N-aminoethyl-aminoethyl) titanate, isopropyl tri dodecylbenzene sulfonyl titanate and the like, the aluminum-based coupling agent being exemplified by acetoalkoxy aluminum diisopropynate and the like; esters including polyhydric alcohol such as esters of polyhydric alcohol (e.g. glycerin monostearate, glycerin monooleate and the like) and a fatty acid; and phosphate esters such as acid type, alkali metal salts or amine salts of monoester or diester of orthophosphoric acid and alcohol (e.g. oleyl alcohol, stearyl alcohol and the like), or acid type, alkali metal salts or amine salts of mixtures of the monoester and the diester.

Surface-treating of the magnesium-hydroxide particles with the above surface-treating agent can be conducted by a publicly known wet process or dry method. For instance, according to the wet process, slurry of the magnesium-hydroxide may be added with the surface-treating agent in a form of liquid or emulsion to be mechanically mixed at approximately 100 degrees C. According to the dry method, powdered magnesium-hydroxide may be added with the surface-treating agent in a form of liquid, emulsion or solid while being stirred by a mixer such as a Henschel mixer. The magnesium-hydroxide and the added surface-treating agent may be mixed together while being heated as necessary. An additive amount of the surface-treating agent may be determined as necessary, but the amount is preferably approximately 10 mass percent or less of the weight of the magnesium-hydroxide particles.

The surface-treated magnesium-hydroxide particles can experience water-washing, dewatering, granulation, drying, pulverization and classification as necessary so as to be formed into a final product.

A flame-retardant resin composition according to another aspect of the present invention includes 100 parts by mass of a polyolefin-based resin and 5 to 500 parts by mass of the above-described flame retardant.

An example of the polyolefin-based resin is a polymer or a copolymer of $C_2$ to $C_8$ olefin (α-olefin) such as polyethylene, polypropylene, a copolymer of ethylene and propylene, polybutene, poly 4-methylpentene-1 and the like.

According to the aspect of the present invention, since the above-described flame retardant is compounded into the polyolefin-based resin by a predetermined amount, the flame-retardant resin composition exhibits high flame retardancy and generates less carbon monoxide and less smoke when combusted.

When the content of the flame retardant is less than 5 parts by mass, a sufficient flame-retardant effect is not obtained. On the other hand, when the content of the flame retardant is more than 500 parts by mass, mechanical properties (e.g. strength, impact resistance) of the resin are deteriorated. The content of the flame retardant is preferably 20 to 400 parts by mass, more preferably 40 to 300 parts by mass.

A molded article according still further aspect of the present invention is formed of the above-described flame-retardant resin composition.

According to the aspect of the present invention, since the flame-retardant resin composition in which the above-described flame retardant is compounded into the polyolefin-based resin by a predetermined amount is used, the molded article exhibits high flame retardancy and generates less carbon monoxide and less smoke when combusted.

EXAMPLES

The present invention will be described in detail by reference to the following examples, but is not limited thereto.

Example 1
Manufacturing of Flame Retardant 480 g of highly pure $MgCl_2 \cdot 6H_2O$ (manufactured by MANAC Incorporated) and 1 liter of purified water were put into a polyethylene container of 3 liters capacity and stirred to prepare $MgCl_2$ aqueous solution. The $MgCl_2$ aqueous solution was slowly added with 510 mL of 8.3N NaOH aqueous solution while being stirred (the proportion of mole number of $Mg^{2+}$ to mole number of $OH^-$ was 1 to 1.8), and further added with purified water to prepare 2 liters of suspension. The suspension was poured into an autoclave equipped with a wetted part of 3 litters of Hastelloy C-276 to be hydrothermally processed at 140 degrees C. for five hours while being stirred. Slurry obtained after the hydrothermal-processing experienced vacuum filtration, such that the slurry was subsequently sufficiently washed by purified water that was 20 times as much as solid contents of the slurry by volume. Then, the slurry was returned to purified water to prepare emulsified slurry with 10 g/dL concentration of $Mg(OH)_2$ solid contents. 1 liter of the emulsified slurry was moved to a SUS316 container of 2 liters capacity (mass of $Mg(OH)_2$ solid contents was equivalent to 100 g) to be heated up to 80 degrees C. while being stirred. On the other hand, 0.027 g of $CuCl_2 \cdot 2H_2O$ was added into a glass beaker of 200 mL capacity that contained 100 mL of purified water, and stirred by a magnetic stirrer. The full amount of the dissolved aqueous solution thus obtained was added to the slurry having been heated up to 80 degrees C. while being stirred (accurate content of the transitional metal compound was obtained through an analysis by the later-described Inductively Coupled Plasma (ICP) method). Subsequently, sodium stearate aqueous solution with a concentration of 5 mass percent was added to the slurry by 2.8 mass percent of the mass of $Mg(OH)_2$ solid contents so as to serve as stearic acid at 80 degrees C. After being surface-processed while being stirred for one hour at 80 degrees C., the slurry experienced vacuum filtration, water-washing by purified water (water volume was 5 times or more of mass of $Mg(OH)_2$ solid contents), drying and pulverization, such that powered flame retardant was obtained.

(Manufacturing of Flame-Retardant Resin Compound and Molding)

As a polyolefin resin, a polypropylene resin (product name: BC-6D, manufactured by Japan Polypropylene Corporation) was used. 122 parts by mass of the powdered flame retardant and 100 parts by mass of the polypropylene resin are kneaded together by Labo Plastomill (manufactured by Toyo Seiki Seisakusho, Ltd) for five minutes at 180 degrees C., and then formed into molded articles of 100 mm by 100 mm by 3 mm by a press molding machine at 180 degrees C.

(Method for Analysis and Evaluation)

The flame retardant and the molded articles obtained by the above method experienced the following analysis and evaluation.

(1) Analysis of Transitional Metal Amount in Flame Retardant

The powdered flame retardant (magnesium-hydroxide) obtained by the above preparing method was calcinated at 600 degrees C. and completely dissolved in an excessive amount of hydrochloric acid, so that the content of the transitional metals (Cu, Co, Ni, Zn and Ti) was measured by the ICP method.

(2) Measurement of BET Specific Surface Area and Average Particle Diameter

The BET specific surface area of the powdered flame retardant obtained was measured by a nitrogen adsorption method while the average particle diameter of the powdered flame retardant was measured with a particle-size-distribution gauge. Each powdered flame retardant exhibited a BET specific surface area of approximately 5 $m^2/g$ and an average particle diameter of approximately 1.2 μm (all examples and comparative examples later described exhibited the same values).

(3) Color Tone of Molding

Color tones of the obtained molded articles were visually checked and evaluated. Moldings found tonable were rated as A while molded articles found to be colored so strongly as to impair tonability were rated as B.

(4) Measurement of Heat Generation Rate

Based on ISO (International Organization for Standardization) 5660 part 1, each test sample was combusted by a cone calorimeter (product type: C3, manufactured by Toyo Seiki Seisakusho Ltd.) at a heater temperature of 660 degrees C., by a radiation amount of 50 $kW/m^2$ and at an outlet flow of 0.024 $m^3$/sec. Heat generation rate was obtained by calculating a maximum heat generation rate based on oxygen consumption measured by an oximeter. The measurement was continued from an ignition to a natural extinction of the flame, i.e., until the test samples were burnt out. The maximum heat generation rate serves as a scale to measure the flame retardancy. The maximum heat generation rate is preferably 200 $kW/m^2$ or less.

(5) Measurement of Carbon Monoxide (CO) Yield

Based on ISO 5660 part 1, each sample (molded article) was combusted by a cone calorimeter (product type: C3, manufactured by Toyo Seiki Seisakusho Ltd.) at a heater temperature of 660 degrees C., by a radiation amount of 50 $kW/m^2$ and at an outlet flow of 0.024 $m^3$/sec. A maximum concentration of CO yield was measured with an infrared spectrophotometer. The measurement was continued from the ignition to the natural extinction of the flame, i.e., until the test samples were burnt out. The maximum concentration of CO yield is preferably 1.6 mass percent or less.

(6) Measurement of Smoke Concentration

Based on ISO 5660 part 2, each test sample was combusted by a cone calorimeter (product type: C3, manufactured by Toyo Seiki Seisakusho Ltd.) at a heater temperature of 660 degrees C., by a radiation amount of 50 $kW/m^2$ and at an outlet flow of 0.024 $m^3$/sec. A maximum smoke concentration was measured by a laser transmission method (unit: $m^{-1}$).

The measurement was continued from an ignition to a natural extinction of the flame, i.e., until the test samples were burnt out. The maximum smoke concentration is preferably 0.057 $m^{-1}$ or less.

Examples 2, 3 and Comparative Examples 1 to 3

Powdered flame retardant of Examples 2, 3 and Comparative Examples 2, 3 was prepared by the same process as in Example 1 except that $CuCl_2 \cdot 2H_2O$ was added respectively by 0.134 g (Example 2), 0.242 g (Example 3), 0.013 g (Comparative Example 2) and 0.859 g (Comparative Example 3). In Comparative Example 1, no aqueous solution of $CuCl_2 \cdot 2H_2O$ was added. Except for the above-mentioned process, flame retardants and molded articles were manufactured, analyzed and evaluated in the same manner as in Example 1. Results of Examples 1 to 3 and Comparative Examples 1 to 3 are shown in Table 1.

TABLE 1

|  | Example 1 | Example 2 | Example 3 | Comparative Example 1 | Comparative Example 2 | Comparative Example 3 |
|---|---|---|---|---|---|---|
| Cu (mass ppm) | 112 | 490 | 925 | 1 | 56 | 3267 |
| Co (mass ppm) | <1 | <1 | <1 | <1 | <1 | <1 |
| Ni (mass ppm) | 1 | 1 | 1 | 1 | 1 | 1 |
| Zn (mass ppm) | 2 | 2 | 2 | 2 | 2 | 2 |
| Ti (mass ppm) | <1 | <1 | <1 | <1 | <1 | <1 |
| Cu + Co + Ni (mass ppm) | <114 | <492 | <927 | <3 | <58 | <3269 |
| Zn + Ti (mass ppm) | <3 | <3 | <3 | <3 | <3 | <3 |
| Maximum Heat Generation Rate (kW/m$^2$) | 179 | 184 | 198 | 221 | 218 | 199 |
| Maximum Concentration of CO yield (mass %) | 1.37 | 1.52 | 1.54 | 1.8 | 1.71 | 1.54 |
| Maximum Smoke Concentration (m$^{-1}$) | 0.055 | 0.056 | 0.057 | 0.061 | 0.06 | 0.057 |
| Coloration | A | A | A | A | A | B |

Examples 4 to 6 and Comparative Examples 4, 5

Flame retardants and molded articles of Examples 4 to 6 and Comparative Examples 4, 5 were manufactured, analyzed and evaluated in the same manner as in Example 1 except that CoCl$_2$.6H$_2$O was added during manufacturing of the flame retardants respectively by 0.061 g (Example 4), 0.162 g (Example 5), 0.364 g (Example 6), 0.004 g (Comparative Example 4) and 0.606 g (Comparative Example 5). Results are shown in Table 2.

TABLE 2

|  | Example 4 | Example 5 | Example 6 | Comparative Example 4 | Comparative Example 5 |
|---|---|---|---|---|---|
| Cu (mass ppm) | 1 | 1 | 1 | 1 | 1 |
| Co (mass ppm) | 156 | 388 | 875 | 13 | 1589 |
| Ni (mass ppm) | 1 | 1 | 1 | 1 | 1 |
| Zn (mass ppm) | 2 | 2 | 2 | 2 | 2 |
| Ti (mass ppm) | <1 | <1 | <1 | <1 | <1 |
| Cu + Co + Ni (mass ppm) | 158 | 390 | 877 | 15 | 1591 |
| Zn + Ti (mass ppm) | <3 | <3 | <3 | <3 | <3 |
| Maximum Heat Generation Rate (kW/m$^2$) | 193 | 194 | 195 | 221 | 202 |
| Maximum Concentration of CO yield (mass %) | 1.35 | 1.38 | 1.47 | 1.77 | 1.65 |
| Maximum Smoke Concentration (m$^{-1}$) | 0.054 | 0.056 | 0.057 | 0.06 | 0.061 |
| Coloration | A | A | A | A | B |

Examples 7 to 9 and Comparative Examples 6, 7

Flame retardants and molded articles of Examples 7 to 9 and Comparative Examples 6, 7 were manufactured, analyzed and evaluated in the same manner as in Example 1 except that $NiCl_2 \cdot 6H_2O$ was added during manufacturing of the flame retardants respectively by 0.101 g (Example 7), 0.263 g (Example 8), 0.324 g (Example 9), 0.032 g (Comparative Example 6) and 1.174 g (Comparative Example 7). Results are shown in Table 3.

TABLE 3

|  | Example 7 | Example 8 | Example 9 | Comparative Example 6 | Comparative Example 7 |
|---|---|---|---|---|---|
| Cu (mass ppm) | 1 | 1 | 1 | 1 | 1 |
| Co (mass ppm) | <1 | <1 | <1 | <1 | <1 |
| Ni (mass ppm) | 258 | 642 | 774 | 84 | 2893 |
| Zn (mass ppm) | 2 | 2 | 2 | 2 | 2 |
| Ti (mass ppm) | <1 | <1 | <1 | <1 | <1 |
| Cu + Co + Ni (mass ppm) | <260 | <644 | <776 | <86 | <2895 |
| Zn + Ti (mass ppm) | <3 | <3 | <3 | <3 | <3 |
| Maximum Heat Generation Rate (kW/m$^2$) | 183 | 190 | 197 | 220 | 198 |
| Maximum Concentration of CO yield (mass %) | 1.32 | 1.4 | 1.45 | 1.74 | 1.46 |
| Maximum Smoke Concentration (m$^{-1}$) | 0.055 | 0.056 | 0.057 | 0.061 | 0.057 |
| Coloration | A | A | A | A | B |

Examples 10 to 12 and Comparative Examples 8, 9

Flame retardants and molded articles of Examples 10 to 12 and Comparative Examples 8, 9 were manufactured, analyzed and evaluated in the same manner as in Example 1 except that $Zn(NO_3)_2 \cdot 6H_2O$ was added during manufacturing of the flame retardants respectively by 0.077 g (Example 10), 0.159 g (Example 11), 0.341 g (Example 12), 0.027 g (Comparative Example 8) and 2.274 g (Comparative Example 9). Results are shown in Table 4.

TABLE 4

|  | Example 10 | Example 11 | Example 12 | Comparative Example 8 | Comparative Example 9 |
|---|---|---|---|---|---|
| Cu (mass ppm) | 1 | 1 | 1 | 1 | 1 |
| Co (mass ppm) | <1 | <1 | <1 | <1 | <1 |
| Ni (mass ppm) | 1 | 1 | 1 | 1 | 1 |
| Zn (mass ppm) | 175 | 353 | 763 | 66 | 5044 |
| Ti (mass ppm) | <1 | <1 | <1 | <1 | <1 |
| Cu + Co + Ni (mass ppm) | <3 | <3 | <3 | <3 | <3 |
| Zn + Ti (mass ppm) | <176 | <354 | <764 | <67 | <5045 |
| Maximum Heat Generation Rate (kW/m$^2$) | 173 | 191 | 195 | 219 | 205 |
| Maximum Concentration of CO yield (mass %) | 1.33 | 1.45 | 1.53 | 1.69 | 1.68 |
| Maximum Smoke Concentration (m$^{-1}$) | 0.054 | 0.055 | 0.056 | 0.061 | 0.059 |
| Coloration | A | A | A | A | A |

Examples 13 to 15 and Comparative Examples 10, 11

Flame retardants and molded articles of Examples 13 to 15 and Comparative Examples 10, 11 were manufactured, analyzed and evaluated in the same manner as in Example 1 except that $[(CH_3)_2CHO]_4Ti$ was added during manufacturing of the flame retardants respectively by 0.119 g (Example 13), 0.267 g (Example 14), 0.475 g (Example 15), 0.018 g (Comparative Example 10) and 2.373 g (Comparative Example 11). Results are shown in Table 5.

TABLE 5

|  | Example 13 | Example 14 | Example 15 | Comparative Example 10 | Comparative Example 11 |
|---|---|---|---|---|---|
| Cu (mass ppm) | 1 | 1 | 1 | 1 | 1 |
| Co (mass ppm) | <1 | <1 | <1 | <1 | <1 |
| Ni (mass ppm) | 1 | 1 | 1 | 1 | 1 |
| Zn (mass ppm) | 2 | 2 | 2 | 2 | 2 |
| Ti (mass ppm) | 230 | 466 | 826 | 28 | 4009 |
| Cu + Co + Ni (mass ppm) | <3 | <3 | <3 | <3 | <3 |
| Zn + Ti (mass ppm) | 232 | 468 | 828 | 30 | 4011 |
| Maximum Heat Generation Rate (kW/m$^2$) | 190 | 193 | 199 | 220 | 205 |
| Maximum Concentration of CO yield (mass %) | 1.26 | 1.38 | 1.52 | 1.63 | 1.71 |
| Maximum Smoke Concentration (m$^{-1}$) | 0.055 | 0.056 | 0.057 | 0.06 | 0.06 |
| Coloration | A | A | A | A | A |

Example 16

A flame retardant and molded articles of Example 16 were manufactured, analyzed and evaluated in the same manner as in Example 1 except that 100 mL of an aqueous solution in which 0.027 g of $CuCl_2.2H_2O$ and 0.068 g of $Zn(NO_3)_2.6H_2O$ were mixed was fully added during manufacturing of the flame retardant.

Example 17

A flame retardant and molded articles of Example 17 were manufactured, analyzed and evaluated in the same manner as in Example 1 except that 100 mL of an aqueous solution in which 0.148 g of $CuCl_2.2H_2O$ and 0.205 g of $Zn(NO_3)_2.6H_2O$ were mixed was fully added during manufacturing of the flame retardant.

Example 18

A flame retardant and molded articles of Example 18 were manufactured, analyzed and evaluated in the same manner as in Example 1 except that 100 mL of an aqueous solution in which 0.188 g of $CuCl_2.2H_2O$ and 0.409 g of $Zn(NO_3)_2.6H_2O$ were mixed was fully added during manufacturing of the flame retardant.

Comparative Example 12

A flame retardant and molded articles of Comparative Example 12 were manufactured, analyzed and evaluated in the same manner as in Example 1 except that 100 mL of an aqueous solution in which 0.011 g of $CuCl_2.2H_2O$ and 0.032 g of $Zn(NO_3)_2.6H_2O$ were mixed was fully added during manufacturing of the flame retardant.

Comparative Example 13

A flame retardant and molded articles of Comparative Example 13 were manufactured, analyzed and evaluated in the same manner as in Example 1 except that 100 mL of an aqueous solution in which 0.403 g of $CuCl_2.2H_2O$ and 0.955 g of $Zn(NO_3)_2.6H_2O$ were mixed was fully added during manufacturing of the flame retardant.

Results of Examples 16 to 18 and Comparative Examples 12 to 13 are shown in Table 6.

TABLE 6

|  | Example 16 | Example 17 | Example 18 | Comparative Example 12 | Comparative Example 13 |
|---|---|---|---|---|---|
| Cu (mass ppm) | 108 | 542 | 716 | 45 | 1450 |
| Co (mass ppm) | <1 | <1 | <1 | <1 | <1 |
| Ni (mass ppm) | 1 | 1 | 1 | 1 | 1 |
| Zn (mass ppm) | 147 | 433 | 879 | 68 | 2167 |
| Ti (mass ppm) | <1 | <1 | <1 | <1 | <1 |
| Cu + Co + Ni (mass ppm) | <110 | <544 | <718 | <47 | <1452 |
| Zn + Ti (mass ppm) | <148 | <434 | <880 | <69 | <2168 |
| Maximum Heat Generation Rate (kW/m$^2$) | 178 | 186 | 195 | 217 | 199 |

TABLE 6-continued

|  | Example 16 | Example 17 | Example 18 | Comparative Example 12 | Comparative Example 13 |
|---|---|---|---|---|---|
| Maximum Concentration of CO yield (mass %) | 1.41 | 1.44 | 1.45 | 1.72 | 1.49 |
| Maximum Smoke Concentration ($m^{-1}$) | 0.054 | 0.055 | 0.056 | 0.06 | 0.058 |
| Coloration | A | A | A | A | B |

Example 19

A flame retardant and molded articles of Example 19 were manufactured, analyzed and evaluated in the same manner as in Example 1 except that 100 mL of an aqueous solution in which 0.054 g of $CuCl_2.2H_2O$, 0.044 g of $CoCl_2.6H_2O$, 0.053 g of $NiCl_2.6H_2O$, 0.091 g of $Zn(NO_3)_2.6H_2O$ and 0.089 g of $[(CH_3)_2CHO]_4Ti$ were mixed was fully added during manufacturing of the flame retardant.

Comparative Example 14

A flame retardant and molded articles of Comparative Example 14 were manufactured, analyzed and evaluated in the same manner as in Example 1 except that 100 mL of an aqueous solution in which 0.008 g of $CuCl_2.2H_2O$, 0.032 g of $CoCl_2.6H_2O$, 0.008 g of $NiCl_2.6H_2O$, 0.032 g of $Zn(NO_3)_2$. $6H_2O$ and 0.030 g of $[(CH_3)_2CHO]_4Ti$ were mixed was fully added during manufacturing of the flame retardant.

Comparative Example 15

A flame retardant and molded articles of Comparative Example 15 were manufactured, analyzed and evaluated in the same manner as in Example 1 except that 100 mL of an aqueous solution in which 0.081 g of $CuCl_2.2H_2O$, 0.202 g of $CoCl_2.6H_2O$, 0.182 g of $NiCl_2.6H_2O$, 0.227 g of $Zn(NO_3)_2$. $6H_2O$ and 0.326 g of $[(CH_3)_2CHO]_4Ti$ were mixed was fully added during manufacturing of the flame retardant.

Comparative Example 16

A flame retardant and molded articles of Comparative Example 16 were manufactured, analyzed and evaluated in the same manner as in Example 1 except that 100 mL of an aqueous solution in which 1.342 g of $CuCl_2.2H_2O$, 0.687 g of $CoCl_2.6H_2O$, 1.579 g of $NiCl_2.6H_2O$, 1.183 g of $Zn(NO_3)_2$. $6H_2O$ and 2.729 g of $[(CH_3)_2CHO]_4Ti$ were mixed was fully added during manufacturing of the flame retardant.

Results of Example 19 and Comparative Examples 14 to 16 are shown in Table 7.

TABLE 7

|  | Example 19 | Comparative Example 14 | Comparative Example 15 | Comparative Example 16 |
|---|---|---|---|---|
| Cu (mass ppm) | 202 | 27 | 310 | 5005 |
| Co (mass ppm) | 113 | 82 | 505 | 1744 |
| Ni (mass ppm) | 131 | 15 | 440 | 3867 |
| Zn (mass ppm) | 196 | 71 | 499 | 2691 |
| Ti (mass ppm) | 150 | 54 | 558 | 4639 |
| Cu + Co + Ni (mass ppm) | 446 | 124 | 1255 | 10616 |
| Zn + Ti (mass ppm) | 346 | 125 | 1057 | 7330 |

TABLE 7-continued

|  | Example 19 | Comparative Example 14 | Comparative Example 15 | Comparative Example 16 |
|---|---|---|---|---|
| Maximum Heat Generation Rate ($kW/m^2$) | 180 | 217 | 184 | 197 |
| Maximum Concentration of CO yield (mass %) | 1.33 | 1.7 | 1.4 | 1.59 |
| Maximum Smoke Concentration ($m^{-1}$) | 0.054 | 0.059 | 0.055 | 0.058 |
| Coloration | A | A | B | B |

(Results)

According to Tables 1 to 7, it can be appreciated that the amount of the specific transitional metal compound(s) contained in the flame retardant is within a predetermined range in each Example, hence that the molded articles compounded with the flame retardant exhibit high flame retardancy and generate less carbon monoxide and less smoke when combusted.

In contrast, since the content of the specific transitional metal compound(s) is less than 100 mass ppm in terms of metals in each of Comparative Examples 1, 2, 4, 6, 8, 10, 12 and 14, the flame retardancy is not sufficient and more carbon monoxide and more smoke are generated. As in Comparative Example 14, even when the total amount of the transitional metal compounds is merely 100 ppm or more in terms of metals, the above-described effects are not sufficiently provided.

Additionally, in Comparative Examples 3, 5, 7, 13 and 16, since the total content of copper, cobalt and nickel is more than 1000 mass ppm, the manufactured molded articles are colored so strongly as to impair the tonability. It is further appreciated that the above-described effects are more or less hampered when the content of the transitional metals is more than 1000 ppm. In Comparative Examples 9, 11, since the total content of zinc and titanium is more than 1000 mass ppm, the above-described effects are severely deteriorated although the tonability is favorable.

The invention claimed is:
1. A flame retardant comprising particles that contain magnesium hydroxide;
one of a cobalt compound in an amount of 100 to 1000 mass ppm in terms of metals and a nickel compound in an amount of 100 to 1000 mass ppm in terms of metals; and
a titanium compound in an amount of 100 to 1000 mass ppm in terms of metals;
provided that the sum of the cobalt compound, the nickel compound and any copper compounds that may be present in the particles is 1000 or less mass ppm in terms of metals, and the sum of the titanium compound and any zinc compounds that may be present in the particles is 1000 or less mass ppm in terms of metals.

2. The flame retardant according to claim 1, wherein a BET specific surface area of the particles is in a range of 1 to 20 m²/g and an average particle diameter of the particles is in a range of 0.5 to 5 μm.

3. The flame retardant according to claim 1, wherein the particles are surface-treated with at least one surface-treating agent selected from the group consisting of a higher fatty acid, a higher fatty acid metallic salt, an anion-based surfactant, a coupling agent, esters including polyhydric alcohols and phosphate esters.

4. A flame-retardant resin composition, comprising: 100 parts by mass of a polyolefin-based resin and 5 to 500 parts by mass of a flame retardant, wherein the flame retardant comprises particles that contain magnesium hydroxide;

one of a cobalt compound in an amount of 100 to 1000 mass ppm in terms of metals and a nickel compound in an amount of 100 to 1000 mass ppm in terms of metals; and a titanium compound in an amount of 100 to 1000 mass ppm in terms of metals;

provided that the sum of the cobalt compound, the nickel compound and any copper compounds that may be present in the particles is 1000 or less mass ppm in terms of metals, and the sum of the titanium compound and any zinc compounds that may be present in the particles is 1000 or less mass ppm in terms of metals.

5. A molded article formed of a flame-retardant resin composition, the flame-retardant resin composition comprising 100 parts by mass of a polyolefin-based resin and 5 to 500 parts by mass of a flame retardant, wherein the flame retardant comprises particles that contain magnesium hydroxide;

one of a cobalt compound in an amount of 100 to 1000 mass ppm in terms of metals and a nickel compound in an amount of 100 to 1000 mass ppm in terms of metals; and a titanium compound in an amount of 100 to 1000 mass ppm in terms of metals;

provided that the sum of the cobalt compound, the nickel compound and any copper compounds that may be present in the particles is 1000 or less mass ppm in terms of metals, and the sum of the titanium compound and any zinc compounds that may be present in the particles is 1000 or less mass ppm in terms of metals.

* * * * *